(12) United States Patent
Ko et al.

(10) Patent No.: US 11,214,900 B2
(45) Date of Patent: Jan. 4, 2022

(54) BALL-SHAPED PHOTOHEATING FIBER COMPOSITE AND METHOD FOR PRODUCING SAME

(71) Applicant: VENTEX CO., LTD., Seongnam-si (KR)

(72) Inventors: Kyung Chan Ko, Seongnam-si (KR); Eun Ho Park, Yongin-si (KR)

(73) Assignee: Ventex Co., Ltd., Seongnam-si (KR)

( * ) Notice: Subject to any disclaimer, the term of this patent is extended or adjusted under 35 U.S.C. 154(b) by 430 days.

(21) Appl. No.: 16/098,363

(22) PCT Filed: Apr. 28, 2017

(86) PCT No.: PCT/KR2017/004577
§ 371 (c)(1),
(2) Date: Nov. 1, 2018

(87) PCT Pub. No.: WO2017/191951
PCT Pub. Date: Nov. 9, 2017

(65) Prior Publication Data
US 2019/0119839 A1    Apr. 25, 2019

(30) Foreign Application Priority Data

May 4, 2016  (KR) .................. 10-2016-0055692
May 4, 2016  (KR) .................. 10-2016-0055695
(Continued)

(51) Int. Cl.
*D04H 1/02*       (2006.01)
*D04H 1/4291*  (2012.01)
(Continued)

(52) U.S. Cl.
CPC ............... *D04H 1/02* (2013.01); *C09D 5/32* (2013.01); *D01D 5/24* (2013.01); *D01D 5/32* (2013.01);
(Continued)

(58) Field of Classification Search
CPC .......... D10B 2321/022; D10B 2331/02; D10B 2331/04; D06M 11/46; D06M 11/47;
(Continued)

(56) References Cited

U.S. PATENT DOCUMENTS

2013/0059110 A1 * 3/2013 Maeno .................. B82Y 40/00
428/96

FOREIGN PATENT DOCUMENTS

JP    2014-079367 A    5/2014
JP    2015-190080 A    11/2015
(Continued)

*Primary Examiner* — Camie S Thompson
(74) *Attorney, Agent, or Firm* — Lewis Roca Rothgerber Christie LLP

(57) ABSTRACT

A ball-shaped light heat generating fiber aggregate and a method for producing the same include a light heat generating material that is sprayed and applied to any one filament or a mixture of two or more filaments selected from the group consisting of a polyamide-based filament, a polyester-based filament, and a polypropylene-based filament, opening and mixing the same to separate the filaments, and producing a ball-shaped fiber aggregate.

6 Claims, 6 Drawing Sheets
(4 of 6 Drawing Sheet(s) Filed in Color)

(30) Foreign Application Priority Data

May 4, 2016 (KR) ........................ 10-2016-0055696
May 4, 2016 (KR) ........................ 10-2016-0055699

(51) Int. Cl.

| | |
|---|---|
| *D04H 1/4334* | (2012.01) |
| *D04H 1/435* | (2012.01) |
| *D01D 5/24* | (2006.01) |
| *D01F 8/06* | (2006.01) |
| *D01F 8/12* | (2006.01) |
| *D01F 8/14* | (2006.01) |
| *D06M 23/06* | (2006.01) |
| *D06B 3/04* | (2006.01) |
| *D04H 1/413* | (2012.01) |
| *C09D 5/32* | (2006.01) |
| *D01D 5/32* | (2006.01) |
| *D06B 1/02* | (2006.01) |
| *D06M 11/46* | (2006.01) |
| *D06M 11/47* | (2006.01) |
| *D06M 101/20* | (2006.01) |
| *D06M 101/32* | (2006.01) |
| *D06M 101/34* | (2006.01) |

(52) U.S. Cl.
CPC .................. *D01F 8/06* (2013.01); *D01F 8/12* (2013.01); *D01F 8/14* (2013.01); *D04H 1/413* (2013.01); *D04H 1/4291* (2013.01); *D04H 1/435* (2013.01); *D04H 1/4334* (2013.01); *D06B 1/02* (2013.01); *D06B 3/04* (2013.01); *D06M 11/46* (2013.01); *D06M 11/47* (2013.01); *D06M 23/06* (2013.01); *D06M 2101/20* (2013.01); *D06M 2101/32* (2013.01); *D06M 2101/34* (2013.01); *D10B 2321/022* (2013.01); *D10B 2331/02* (2013.01); *D10B 2331/04* (2013.01)

(58) Field of Classification Search
CPC .......... D06B 1/02; D06B 3/04; D04H 1/4291;
D04H 1/4334; D04H 1/435; D04H 1/02;
D04H 1/44; C09D 5/32; D04G 5/00
USPC ......... 428/393, 395, 357, 397, 96, 220, 374,
428/370
See application file for complete search history.

(56) References Cited

FOREIGN PATENT DOCUMENTS

| | | |
|---|---|---|
| KR | 10-2001-0004307 | 1/2001 |
| KR | 10-0405319 B1 | 11/2003 |
| KR | 10-1183949 B1 | 9/2012 |
| KR | 10-2015-0117498 A | 10/2015 |
| KR | 10-1581383 B1 | 12/2015 |

* cited by examiner

BALL-SHAPED PHOTOHEATING FIBER COMPOSITE AND METHOD FOR PRODUCING SAME

CROSS-REFERENCE TO RELATED APPLICATION

This application is a National Phase Patent Application of International Patent Application Number PCT/KR2017/004577, filed on Apr. 28, 2017, which claims priority of Korean Patent Application Nos. 10-2016-0055692, 10-2016-0055695, 10-2016-0055696, and 10-2016-0055699, each filed on May 4, 2016, in the Korean Intellectual Property Office, the entire contents of all of which are incorporated herein by reference.

FIELD

Embodiments of the present invention relate to a ball-shaped light heat generating fiber aggregate and a method of producing the same, such that the light heat generating material is included in the ball-shaped fiber aggregate produced using filaments.

BACKGROUND

Outdoor clothing has become more popular, such that outdoor products are already in the deep part of our life and virtually anyone can wear a goose down or duck down jumper to maintain their body temperature when the cold wind blows. Through the accurate information about outdoor products provided by many media, consumers have started to demand for outdoor products that are more suitable for everyday life than high-priced products with high functionality and heat retention for the extreme environment. These trends have resulted in the development of winter outdoor products that have the high functionality of providing heat retention, and being windproof and breathable as well as being thin and lightweight. Thus, their popularity is increasing day by day.

Accordingly, outdoor products with increased heat insulation are produced by a passive method of preventing the heat released from the human body from being lost to the outside and a positive method of utilizing the heat applied from the outside. The former method includes a method of keeping the heat generated from the body warm by the air layer of the fabric, a method of using an infrared reflective material which substantially does not radiate radiant heat released from the human body to the outside of the clothes, a method of using a material absorbing radiant heat released from the human body and the like. The latter method includes a method of introducing an electric heating material, a method of introducing a chemical reaction heat insulating material, and a method of introducing a solar light condensing heat insulating material into clothes.

However, most of the cold weather products currently on the market use a heat insulation method by the air layer among the former methods, which is to increase the thickness of the fabric constituting the clothes, causing the activity capability to be lowered. Feather, which is used for the inner insulator, is aggregated and exudated during washing so as to reduce the insulating ability and ruin their appearance.

In addition, goose down or duck down is mainly used as the feather, and mainly fluff and feather are mixed and used. The fluff is mainly obtained from the chest, under the lower part, under the neck, and under the wings of birds, which functions to enhance the heat-retaining property and tactility of the cold weather product. Feather improves the volume and fill-power to enhance the force of restoration. However, the virus readily spreads due to a little negligence, resulting in the frequent occurrence of avian influenza. It is a material limitedly obtained from birds. Thus, it is virtually impossible to supply products at low prices because it is difficult to produce large quantities of products.

Accordingly, in order to satisfy consumer needs of various classes, it is required to develop a general-purpose outdoor product and domestic materials therefor, which has superior functionality and price competitiveness as compared to the conventional material.

Korean Patent No. 10-1183949 discloses padding for an insulator by using and laminating synthetic fibers and mammal fur together. The padding includes a multi-layered insulator prepared by laminating a synthetic fiber layer and a mixed layer of a mammal fur and a synthetic fiber. Thus, it is a stable insulator in a form with a proper thickness without aggregation or fiber exudation. However, the process is troublesome because a separate facility is additionally required for supplying the mammal fur to the conventional padding production facility. Further, feather such as mammal fur is mixed with the synthetic fiber to reduce the merit of feather and to have lower price competitiveness than a conventional synthetic thermal insulator.

Further, fiber aggregates for fillers using general synthetic fibers are produced in a nonwoven web-type in which filaments are laminated in a certain thickness as disclosed in Korean Patent No. 10-0405319.

However, when the nonwoven web-type is manufactured as described above, the size and shape of the nonwoven fabric web are fixed, resulting in poor usability, clumping, and deterioration of the force of restoration in long-term use.

In order to solve the problems of the conventional art as described above, a ball-shaped fiber aggregate has been recently developed, and its usage is gradually increasing. The ball-shaped fiber aggregate is produced by aggregating filaments in a ball-shaped formation. It is not a fixed shape like a nonwoven web-type and is an individually separate fiber aggregate such as down of a bird so that the ability to include air or the force of restoration is excellent.

However, the conventional ball-shaped fiber aggregate has only a passive thermal insulation effect depending on the ability to include air and is manufactured through many processes. Thus, there is a problem that the whiteness of the original fiber color is significantly lowered, the size of the fiber aggregate is not uniform, and the ball-shape advantage is impaired in the ability to include air or the force of restoration due to the high density.

SUMMARY

Embodiments of the present invention address the issues of the conventional art, which is to provide a ball-shaped light heat generating fiber aggregate and a method of producing the same, which is formed by maximizing a heat-retaining property due to a heating function by thermal insulating property and light heat generation using synthetic fibers.

Further, embodiments of the present invention provide a ball-shaped light heat generating fiber aggregate capable of minimizing the density of the fiber aggregate and uniformizing the size of the fiber aggregate, thereby maximizing the ability to include air and the force of restoration.

Further, embodiments of the present invention provide a fiber thermal insulator including a ball-shaped fiber aggregate with excellent heat retention as described above.

Embodiments of the present invention provides a ball-shaped light heat generating fiber aggregate prepared by spaying and applying a light heat generating material to any one filament or a mixture of two or more filaments selected from the group consisting of a polyimide-based filament, a polyester-based filament, and a polypropylene-based filament, opening and mixing the same to separate the filaments, and then producing a ball-shaped fiber aggregate, in which the light heat generating material is any one or a mixture of two or more of ATO, ITO, and Group 4 metal oxides, and in which the standard deviation of the average diameter of the fiber aggregate is 1 to 1.5, and the kurtosis thereof is 3 or more.

Further, embodiments of the present invention provide a ball-shaped fiber aggregate having a density of 3.5 g/l to 6 g/l.

Further, embodiments of the present invention provide a ball-shaped fiber aggregate having 600 counts to 1200 counts per 1 g.

Further, embodiments of the present invention provide a ball-shaped fiber aggregate having an average diameter of 3 mm to 20 mm.

Further, embodiments of the present invention provide a ball-shaped fiber aggregate in which the filament of the fiber aggregate includes at least 50% by weight of a side-by-side-typed conjugated fiber.

Further, embodiments of the present invention provide a ball-shaped fiber aggregate in which the conjugated fiber is a hollow conjugated fiber.

Further, embodiments of the present invention provide a ball-shaped fiber aggregate in which the any one filament or a mixture of two or more filaments selected from the group consisting of a polyimide-based filament, a polyester-based filament, and a polypropylene-based filament has a fineness of 1.5 deniers to 7 deniers (D) and a fiber length of 15 mm to 60 mm.

Further, embodiments of the present invention provide a fiber thermal insulator including the ball-shaped light heat generating fiber aggregate as described above.

Further, embodiments of the present invention provide a fiber thermal insulator in which temperatures of the surface and the inside of the fiber thermal insulator are increased by 10° C. or more due to the light heat generation, and the temperature difference between the surface and the inside is 0.1° C. to 5° C.

Further, embodiments of the present invention provide a method of producing a ball-shaped light heat generating fiber aggregate, the method including: preparing any one filament or a mixture of two or more filaments selected from the group consisting of a polyamide-based filament, a polyester-based filament, and a polypropylene-based filament; first-opening the selected filament to separate fibers; first-mixing the first-opened filament by wind power; spraying a light heat generating material to the mixed filament using a spray nozzle to apply the light heat generating material to the filament; drying the same with hot air so that the light heat generating material adheres to the filament; second-opening the light heat generating material-attached filament to separate fibers; second-mixing the second-opened filament by wind power; and producing the ball-shaped fiber aggregate by agglomerating the second-mixed filament.

Further, embodiments of the present invention provide a method of producing a ball-shaped light heat generating fiber aggregate in which the first-opening and second-opening are carried out by a carding cleaner in which two to four rollers having a plurality of pins are crossed such that the pins engage with each other, and in which the following Equation is applied.

$$2 \leq L/G \leq 6 \qquad \text{Equation}$$

L: Fiber length of filament
G: Spacing between pins

Further, embodiments of the present invention provide a method of producing a ball-shaped light heat generating fiber aggregate, in which the first-mixing and second-mixing are carried out under a wind pressure of 100 mmAq to 200 mmAq and a wind volume of 20 to 80 m$^3$/min.

Further, embodiments of the present invention provide a method of producing a ball-shaped light heat generating fiber aggregate, in which the spraying includes laminating the mixed filament in 3 cm to 10 cm and then spraying the light heat generating material at a nozzle pressure of 0.2 MPa to 1 MPa.

Further, embodiments of the present invention provide a method of producing a ball-shaped light heat generating fiber aggregate, in which the drying is carried out in hot air of 80° C. to 180° C. for 30 minutes to 120 minutes.

Further, embodiments of the present invention provide a method of producing a ball-shaped light heat generating fiber aggregate, in which the producing the ball-shaped fiber aggregate includes moving the filament by wind power and moving the pin with a bent tip in a direction perpendicular to the wind to generate the ball-shaped fiber aggregate.

The ball-shaped light heat generating fiber aggregate according to embodiments of the present invention is used to have an effect of maximizing a heat-retaining property due to a heating function by a thermal insulating property and light heat generation using synthetic fibers.

Further, the ball-shaped light heat generating fiber aggregate has effects of uniformizing the diameter of the fiber aggregate and minimizing the density thereof in which the used filaments are opened and mixed, resulting in fine separation to provide a ball-shaped formation.

Further, the fiber aggregate of embodiments of the present invention is produced in a ball-shaped formation to improve usability, ability to include air and the force of restoration.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
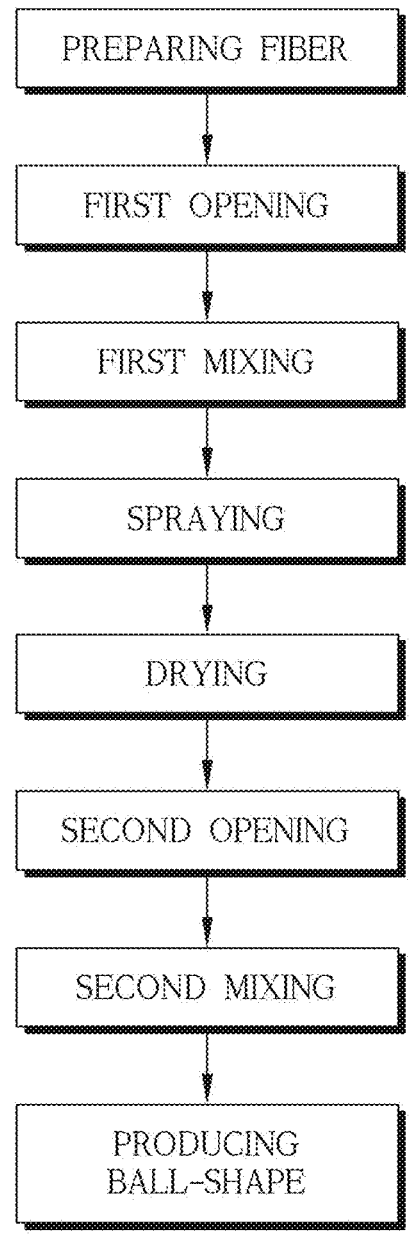
FIG. 1 is a flowchart illustrating the method of producing a ball-shaped light heat generating fiber aggregate according to an embodiment of the present invention.

Hereinafter, preferred embodiments of the present invention are described in more detail with reference to the accompanying drawings in the present invention. First, it should be understood that, in the drawings, the same components or parts are denoted by the same reference numerals whenever possible. In describing embodiments of the present invention, a specific description of a related known function or configuration is excluded in order to avoid obscuring the gist of the present invention.

The term "about" or "approximate" used in the present specification is used as a numerical value or a meaning close to the numerical value when a unique manufacturing and material allowable error is suggested to a mentioned meaning, and is used for preventing an unconscionable infringer from illegally using the disclosed contents including an accurate or absolute numerical value mentioned for helping the understanding of the present invention.

Figure 2:
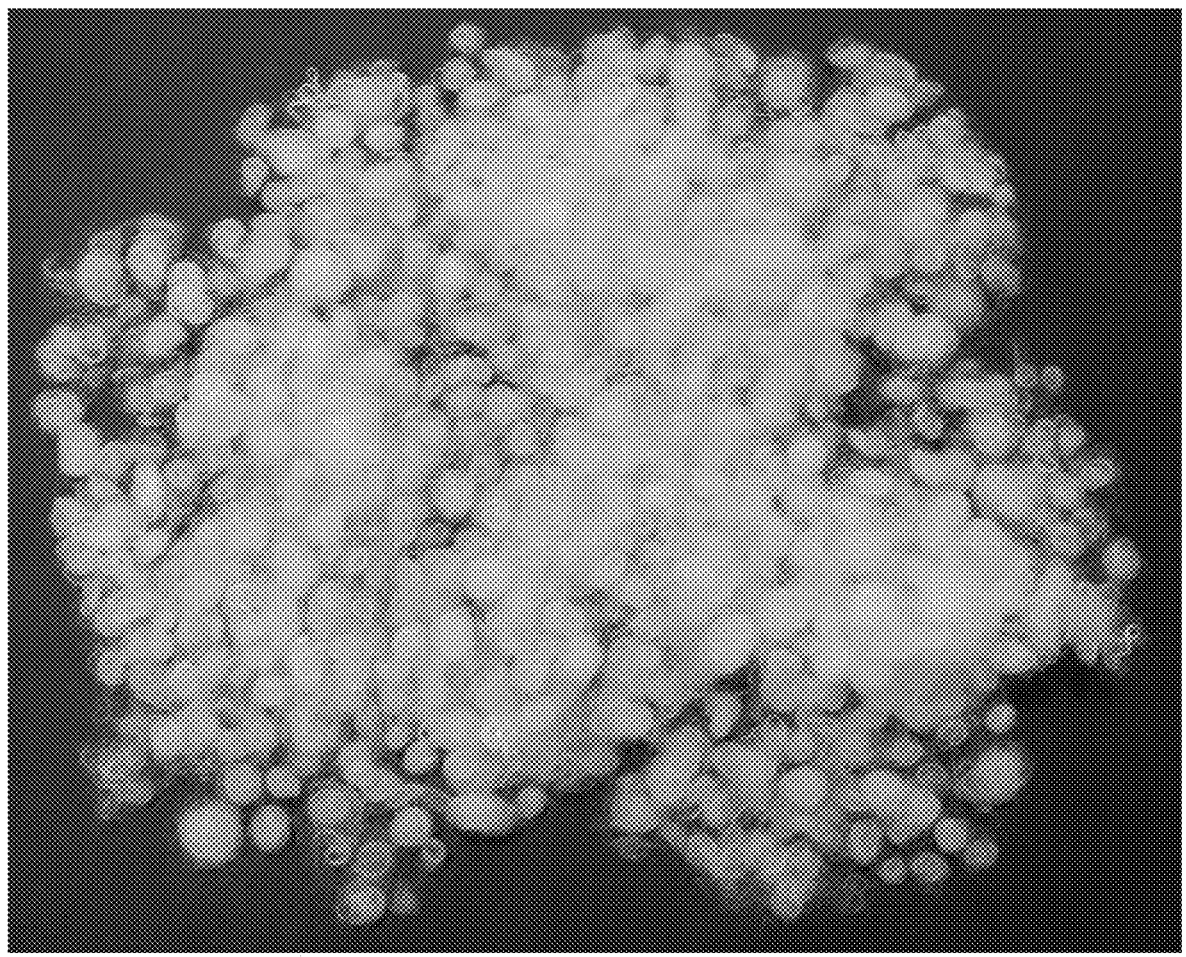
FIG. 2 is a photograph illustrating an example of a ball-shaped light heat generating fiber aggregate of an embodiment of the present invention.
Figure 3:
FIG. 3 is a photograph illustrating a light heat generating evaluation method of a fiber thermal insulator including a ball-shaped light heat generating fiber aggregate of an embodiment of the present invention.
Figure 4:
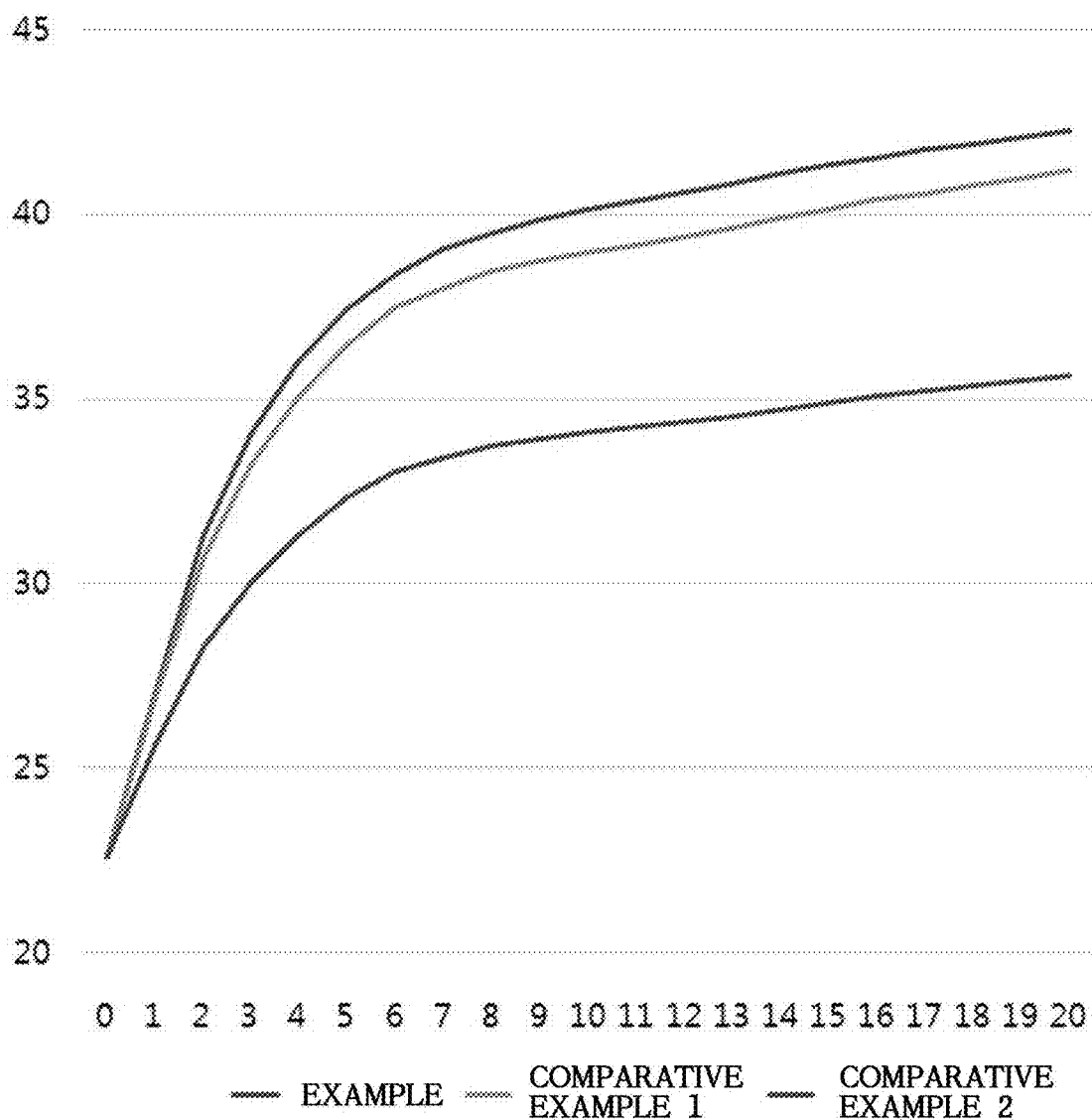
FIG. 4 is a graph illustrating an increase in a time-dependent temperature according to light heat generation of the ball-shaped light heat generating fiber aggregate of an embodiment of the present invention.
Figure 5:
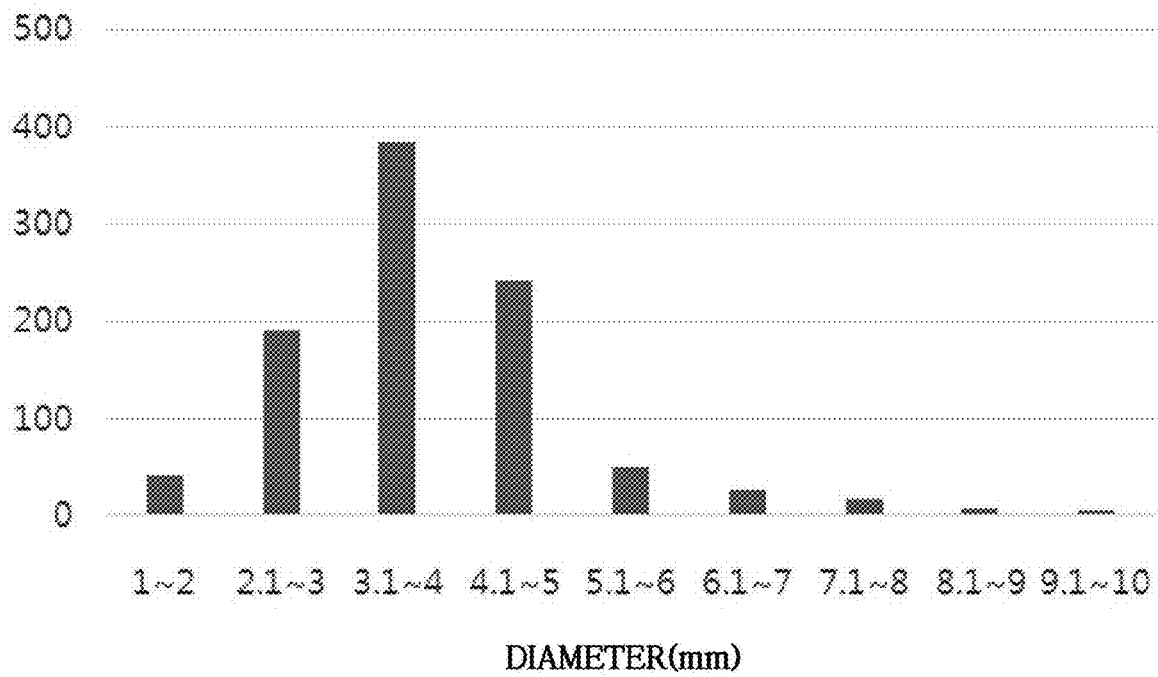
FIGS. 5-8 are graphs illustrating the fiber aggregate diameter distribution of Examples and Comparative Examples.
Figure 6:
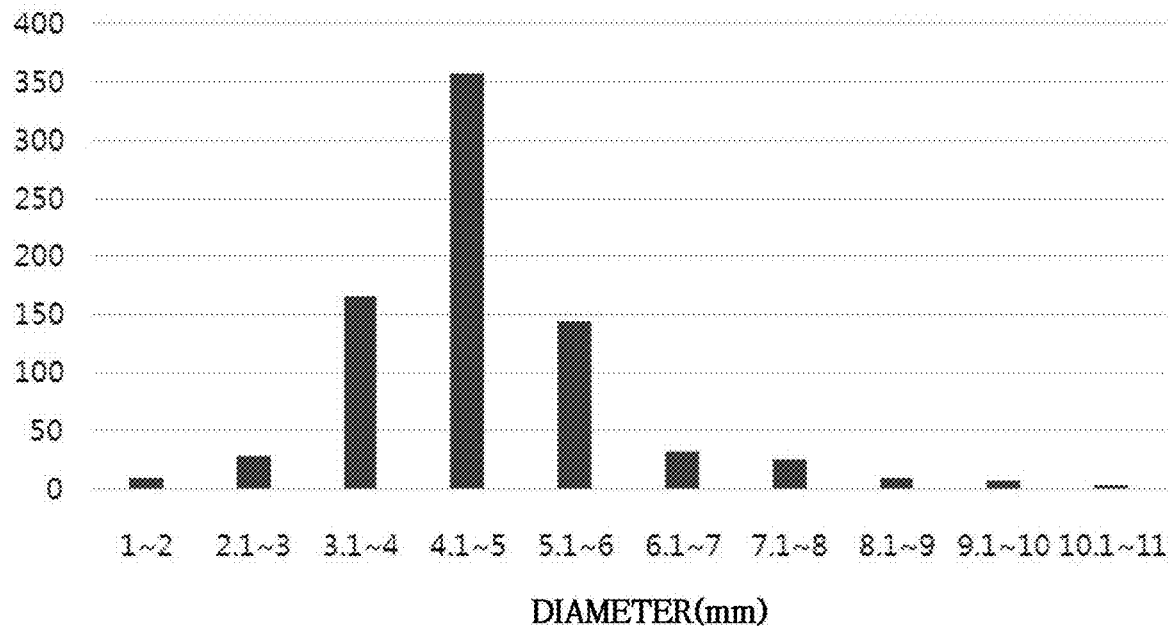
Figure 7:
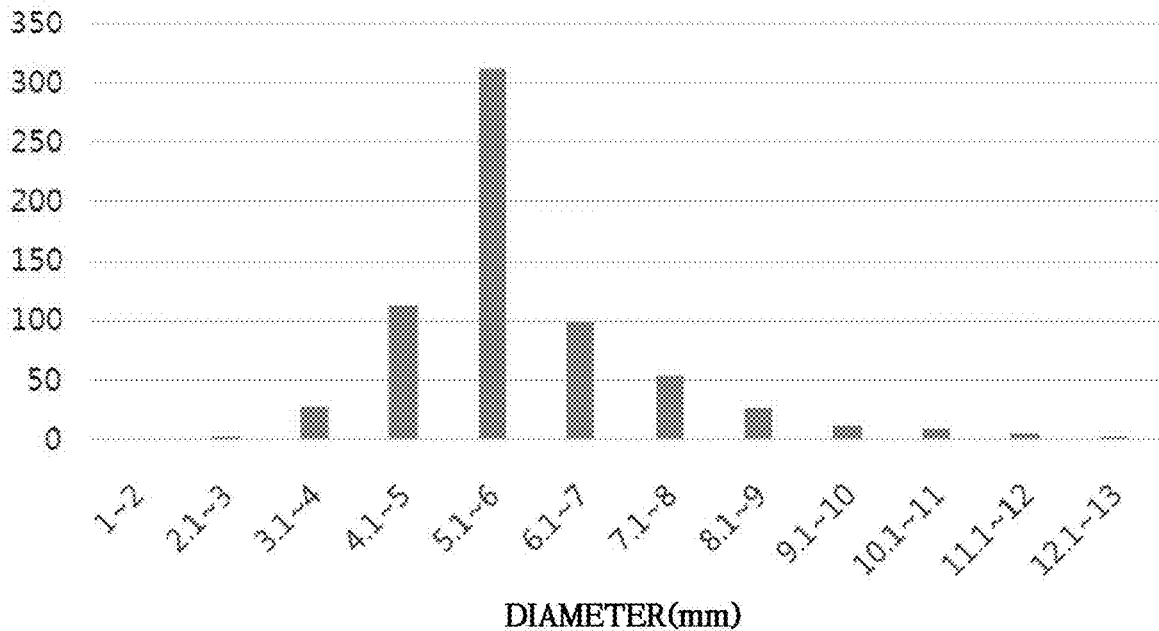
Figure 8:
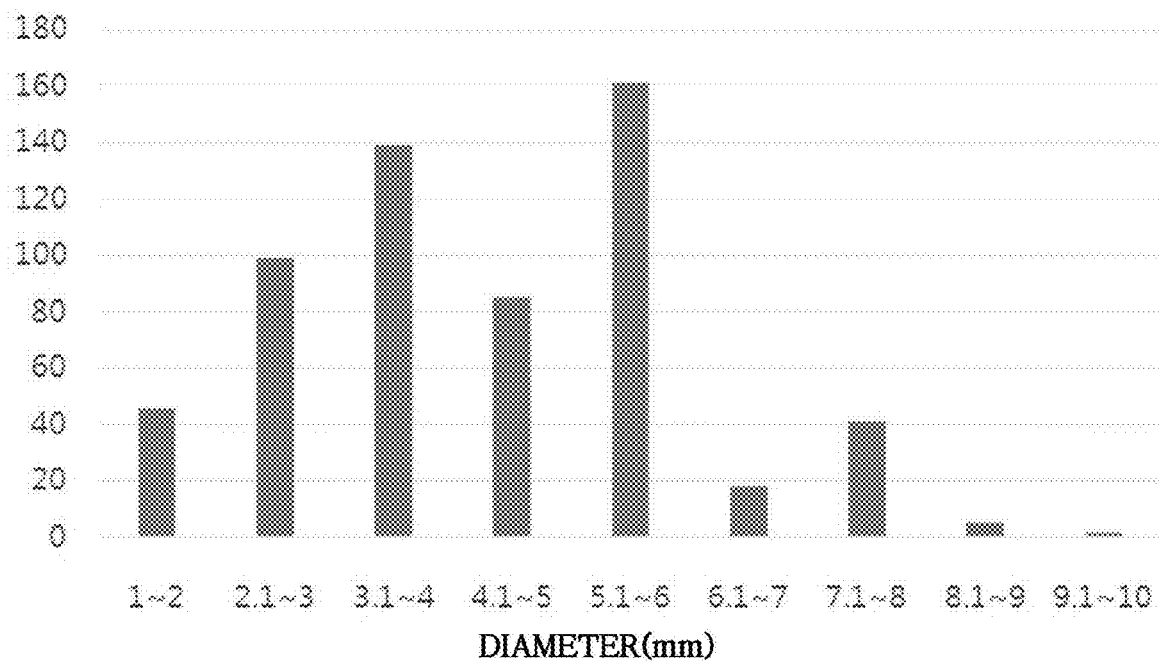

FIG. 1 is a flowchart illustrating the method of producing a ball-shaped light heat generating fiber aggregate according to an embodiment of the present invention. FIG. 2 is a photograph illustrating an example of a ball-shaped light heat generating fiber aggregate of an embodiment of the present invention. FIG. 3 is a photograph illustrating a light heat generating evaluation method of a fiber thermal insulator including a ball-shaped light heat generating fiber aggregate of an embodiment of the present invention. FIG. 4 is a graph illustrating an increase in a time-dependent temperature according to light heat generation of the ball-shaped light heat generating fiber aggregate of an embodiment of the present invention. FIGS. 5-8 are graphs illustrating the fiber aggregate diameter distribution of Examples and Comparative Examples.

Embodiments of the present invention relate to a ball-shaped light heat generating fiber aggregate and a method of producing the same, which is prepared by including preparing fibers, first-opening, first-mixing, spraying, drying, second-opening, second-mixing, and producing a ball-shaped formation.

The preparing fibers process is a step of preparing filaments to be formed in a ball-shaped light heat generating fiber aggregate. In embodiments of the present invention, the preparing fibers may be carried out by preparing any one filament or a mixture of two or more filaments selected from the group consisting of a polyamide-based filament, a polyester-based filament, and a polypropylene-based filament having 1.5 deniers to 7 deniers.

The ball-shaped light heat generating fiber aggregate of embodiments of the present invention preferably uses filaments, side-by-side-typed conjugated fibers which use two polymers having different respective thermal histories, which are at least 50% by weight of filaments used to enhance physical properties of the ball-shaped light heat generating fiber aggregate such as elasticity and ability to include air.

Further, a hollow filament may be used to increase the ability to include air of the ball-shaped light heat generating fiber aggregate, thereby enhancing heat-retaining ability of the ball-shaped light heat generating fiber aggregate. The side-by-side-typed conjugated fiber may preferably use the hollow conjugated fiber.

As described above, the preparing fibers may be carried by preparing two or more kinds of filaments for the physical properties and functionality thereof.

The first-opening process is a step of strand-by-strand separating the filaments provided in a bundled state, which is the first process to perform the following mixing process readily, thereby uniformly fixing the light heat generating material to the filaments in the spraying process.

The first-mixing process is a step of mixing the opened filaments in the first-opening process by the wind power. When two or more kinds of filaments are used, the first-mixing process functions to mix the filaments uniformly and to completely separate the filaments separated from the first-opening process.

The spraying process is a step of applying a light heat generating material to the filaments by spraying the light heat generating material on the mixed filaments with a spray nozzle.

The spraying process is preferably carried out by laminating the mixed filament to a thickness of 3 cm to 10 cm and then spraying the light heat generating material to the filaments at a nozzle pressure of 0.2 MPa to 1 MPa.

When the lamination thickness of the mixed filaments is too thick, or the nozzle pressure is low, the light heat generating material may not be applied to the filament existing on the bottom surface. When the lamination thickness is too thin, or the nozzle pressure is too high, the light heat generating material may be applied too much thereto, thus deteriorating the economic feasibility.

The thickness of the laminated mixed-filaments in the spraying process is preferably 5 cm to 8 cm, and the nozzle pressure thereof is most preferably 0.4 MPa to 0.8 MPa.

The light heat generating material used in embodiments of the present invention may be a material which amplifies sunlight to function to heat generation, which may include antimony tin oxide (ATO), indium tin oxide (ITO), or Group 4 metal oxide such as titanium, zirconium, and hafnium, which do not inhibit the inherent color of the fiber. The light heat generating material of embodiments of the present invention may include any one or a mixture of two or more of the light heat generating materials.

In the spraying process, the light heat generating material and a binder are preferably used to spray the same to the filaments. The binder may be any binder used in the fiber, but it is preferable to use a binder having high transparency which does not inhibit the inherent color of the fiber.

In embodiments of the present invention, it is preferable to use an acrylic-based binder having excellent transparency or a silicone-based binder capable of improving whiteness thereof.

The light heat generating material and the binder may be mixed to have, and may be used at, a weight ratio of 4:6 to 8:2.

The drying process is a step of drying with hot air so that the light heat generating material is fixed to the filament. The temperature and the drying time of the hot air can be controlled according to the filament to be used. Generally, it is dried in hot air at 80° C. to 180° C. for 30 minutes to 120 minutes.

The drying process is preferably carried out at a given temperature and for given time sufficient so as to entirely fix the light heat generating material applied to the filaments.

The second-opening process is a step of strand-by-strand separating the filaments fixed with the light heat generating material after the spraying process and drying process of the light heat generating material.

The second-mixing process is a step of mixing the opened filaments in the second-opening process by the wind force, thereby completely separating the filaments separated in the second-opening process.

In embodiments of the present invention, the opening and mixing processes are very important processes to determine the uniformity and density of the ball-shaped light heat generating fiber aggregate, which should be performed so that the fibers are more uniformly separated as compared to other opening and mixing processes.

The first-opening and the first-mixing processes are processes for uniformly applying the light heat generating material to the filament in the spraying process. The second-opening and the second-mixing processes are processes for separating filaments so that the filaments aggregate uniformly to be a ball-shaped formation in the following producing a ball-shaped formation process, which should be carried out by separating the filaments strand-by-strand.

In order to separate filaments, strand-by-strand, the first-opening and first-mixing processes in embodiments of the present invention may be carried out by a carding cleaner in which two to four rollers having a plurality of pins are crossed such that the pins engage with each other, and in which the following Equation is preferably applied.

$$2 \leq L/G \leq 6 \qquad \text{Equation}$$

L: Fiber length of filament
G: Spacing between pins

The spacing between pins of the carding cleaner can be adjusted according to the fiber length of the filament. When the fiber length is long, the filament can be separated even though the spacing between pins is large. When the fiber length is short, the spacing between pins must also be narrowed.

When the spacing between pins is narrow, the filament can be finely separated, but the processing time may be long. Thus, the L/G value is preferably 2 or more. When the spacing between pins is too wide, the processing time may be short, but filaments are not separated sufficiently, and the uniformity of the ball-shaped fiber aggregate may be lowered. Thus, it s preferable that the L/G value does not exceed 6.

The fiber length of the filament that may be used in embodiments of the present invention is 15 mm to 60 mm, and the spacing between pins should be adjusted to suit the fiber length of the filament to be used.

Further, the first-mixing and the second-mixing processes may be carried out by mixing at a wind pressure of 100 mmAq to 200 mmAq and a wind volume of 20 m³/min to 80 m³/min so that the filaments opened in the first-opening and the second-opening processes are separated strand-by-strand and are moved by wind force.

The filaments may be separated without clumping through high wind power in the mixing process.

The producing a ball-shaped formation process is a process of aggregating the filament wholly separated in the mixing process to produce a ball-shaped formation.

The producing a ball-shaped formation process is carried out in which the filaments are moved by the wind power, and the pin with a bent tip is moved in the direction perpendicular to the wind power. When the filaments moved by the wind power are caught by the pin with a bent tip which is moved in the direction perpendicular to the wind power, a rotating torque is generated so that the filaments are bent at the pin with a bent tip to be bundled into a ball-shaped formation.

The producing a ball-shaped formation process may be carried out through a manufacturing apparatus having a rotatable roller having a plurality of pins having a bent tip and a wind turbine capable of moving the filaments.

The ball-shaped light heat generating fiber aggregate according to embodiments of the present invention as described above can be adjusted in size by the amount of the filament of the rotational speed of the rotatable roller having a plurality of pins having a bent pin, the number of filaments, or wind power, such as wind speed. However, the average diameter of the ball-shaped light heat generating fiber aggregate preferably is 3 mm to 20 mm for ease of use.

In the ball-shaped light heat generating fiber aggregate as described above, the light heat generating material that does not inhibit the intrinsic whiteness of fibers is uniformly applied to filaments, and the filaments are uniformly bundled to form a ball-shape, thereby having excellent whiteness. Thus, the whiteness (L*) of the ball-shaped light heat generating fiber aggregate according to embodiments of the present invention is preferably 85 or more and more preferably in the range of 90 to 99.

The ball-shaped light heat generating fiber aggregate according to embodiments of the present invention has a high ability to include air and the improved heat-retaining property as a density thereof is lower. The ball-shaped light heat generating fiber aggregate of embodiments of the present invention has a uniform diameter by finely separating filaments due to the opening and mixing processes. The fiber aggregate preferably has a density of 3.5 g/l to 6 g/l.

When the density of the ball-shaped light heat generating fiber aggregate is less than 3.5 g/l, the recoverability may be deteriorated. When the density exceeds 6 g/l, the uniformity may be deteriorated.

The ball-shaped light heat generating fiber aggregate of embodiments of the present invention has the plurality of fiber aggregates per 1 g. The number of fiber aggregates per 1 g may vary depending on the diameter of the fiber aggregates. However, an embodiment of the present invention preferably includes 600 to 1200 of the ball-shaped light heat generating fiber aggregates per 1 g.

Further, the standard deviation of the average diameter of the ball-shaped light heat generating fiber aggregates may preferably be 1 to 1.5, and the kurtosis thereof may preferably be 3 or more.

The standard deviation of the average diameter is a distribution of fiber aggregates. The kurtosis is a measure of the uniformity of fiber aggregates. The standard deviation of the average diameter is more than 1.5, and the kurtosis is less than 3, indicating that the ball-shaped light heat generating fiber aggregate does not have a uniform diameter.

The ball-shaped light heat generating fiber aggregate of embodiments of the present invention has a ball-shape in which filaments are separated strand-by-strand. In order to maintain a certain shape, the ball-shaped light heat generating fiber aggregates may be filled in a cover such as an outer covering so as to form a fiber thermal insulator of embodiments of the present invention.

The shape of the fiber thermal insulator including the ball-shaped light heat generating fiber aggregate according to embodiments of the present invention formed as described above can vary depending on the shape of the cover including the ball-shaped light heat generating fiber aggregate. Therefore, there are advantages that it can be used in various fields.

Further, in the fiber thermal insulator of embodiments of the present invention, the light heat generating material is applied to all of the filaments constituting the ball-shaped light heat generating fiber aggregate. Thus, the light-heat generation functions in the depth of the solar light transmitted, resulting in the light heat generating in the surface and the inside of the fiber thermal insulator. This heat generating function causes a decrease in the difference between the surface and the inside temperatures, resulting in an excellent heat-retaining property.

In particular, the infrared rays of sunlight have a high permeability, which can transmit through most of the fiber fabrics. A cover made of fiber fabric is preferably used to form a fiber thermal insulator including the ball-shaped light heat generating fiber aggregate according to embodiments of the present invention.

Hereinafter, Examples of a method of producing the ball-shaped light heat generating fiber aggregate according to embodiments of the present invention are described, but the present invention is not limited to Examples.

EXAMPLE

1. Production of Ball-Shaped Light Heat Generating Fiber Aggregate

The used filaments included 10% by weight of polyester filament having a fineness of 2.5 deniers and a fiber length of about 22 mm to about 32 mm and 90% by weight of a side-by-side hollow conjugated fiber having a fineness of 3 deniers and a fiber length of about 28 mm to about 40 mm.

The filaments were firstly opened using a carding cleaner in which four rollers with a pin spacing of 8.3 mm are formed. The filaments were firstly mixed by wind power with a wind pressure of 140 mmAq and a wind volume of 50 m³/min to separate the filaments. Then, the filaments were laminated to have a width of 7 cm. Then, the mixture obtained by mixing the light heat generating material (ATO) and the binder was sprayed through a spray nozzle at a nozzle pressure of 0.6 MPa to apply the light heat generating material to the filaments.

The filaments applied with the light heat generating material were dried in hot air at 140° C. for 60 minutes and subjected to the second-opening and the second-mixing processes like the first-opening and first-mixing processes.

A manufacturing apparatus having a rotatable roller having a plurality of pins having bent tips and a wind turbine capable of moving filaments was used to allow the filaments obtained from the second-mixing process to be converted into ball-shaped fiber aggregates having a standard diameter of 4 mm (Example 1), 5 mm (Example 2) and 6 mm (Example 3), respectively. The image of the ball-shaped fiber aggregate of Example 1 produced above is illustrated in FIG. 2.

2. Production of Fiber Thermal Insulator

A cover having a thickness of 1 cm and a width of 12 cm was produced using a fabric made of polyester yarn. The inside of the cover was filled with the light heat generating fiber aggregate of Example 1 produced above to produce the fiber thermal insulator including ball-shaped light heat generating fiber aggregates.

Comparative Example 1

The same procedure as in Example 1 was carried out except that the second-opened filaments were made from a general nonwoven web-typed fiber aggregate. The produced web-typed fiber aggregates were placed inside a cover having a thickness of 1 cm and a width of 12 cm to produce the fiber thermal insulator.

Comparative Example 2

The first-mixed filaments of Example 1 were fabricated into a general nonwoven web-typed fiber aggregate. Then, a light heat generating material was sprayed on the only surface of the fiber aggregate. The produced web-typed fiber aggregates were placed inside a cover having a thickness of 1 cm and a width of 12 cm to produce the fiber thermal insulator.

⊚ Evaluation Test of Light Heat Generating

In the light heat generating evaluation test, a fiber thermal insulator including the fiber aggregates of Example 1 and Comparative Examples 1 and 2 was laminated as illustrated in FIG. 3, and then a temperature sensor was inserted between the fiber insulators to measure the internal temperature at the time of light heat generation, and the surface temperature was measured with a thermal imaging camera at 5 minute intervals.

(1) Experimental Method
a. Temperature and humidity of laboratory: 22 (±2) ° C. and 40 (±5) % R.H.
b. The sample was stabilized in the laboratory so that its temperature was equal thereto.
c. A light bulb of 500 W was lighted for 20 minutes at a distance of 45 cm from the sample to induce the light heat generation to the sample.

(2) Evaluation Results of Light Heat Generating

The experimental method as described above was used to evaluate the light heat generation of the Example and Comparative Examples. The experimental results are shown in Table 1 and illustrated FIG. 4.

TABLE 1

| Time (min) | Example Inside | Example Surface | Comparative Example 1 Inside | Comparative Example 1 Surface | Comparative Example 2 Inside | Comparative Example 2 Surface |
|---|---|---|---|---|---|---|
| 0 | 22.62 | 22.61 | 22.62 | 22.62 | 22.63 | 22.62 |
| 1 | 26.99 | — | 26.88 | — | 25.61 | — |
| 2 | 31.29 | — | 30.65 | — | 28.25 | — |
| 3 | 34.04 | — | 33.21 | — | 30.04 | — |
| 4 | 36.06 | — | 35.06 | — | 31.33 | — |
| 5 | 37.44 | 39.2 | 36.46 | 39.4 | 32.31 | 40.1 |
| 6 | 38.37 | — | 37.47 | — | 33.02 | — |
| 7 | 39.05 | — | 37.99 | — | 33.38 | — |
| 8 | 39.48 | — | 38.44 | — | 33.70 | — |
| 9 | 39.83 | — | 38.75 | — | 33.92 | — |
| 10 | 40.14 | 41.8 | 38.97 | 41.9 | 34.07 | 43.3 |
| 11 | 40.35 | — | 39.17 | — | 34.21 | — |
| 12 | 40.59 | — | 39.4 | — | 34.37 | — |
| 13 | 40.82 | — | 39.61 | — | 34.52 | — |
| 14 | 41.11 | — | 39.87 | — | 34.70 | — |
| 15 | 41.31 | 42.4 | 40.14 | 43.2 | 34.89 | 43.5 |
| 16 | 41.53 | — | 40.38 | — | 35.06 | — |
| 17 | 41.76 | — | 40.56 | — | 35.18 | — |
| 18 | 41.89 | — | 40.76 | — | 35.32 | — |
| 19 | 42.07 | — | 40.97 | — | 35.47 | — |
| 20 | 42.24 | 42.5 | 41.17 | 43.1 | 35.61 | 43.5 |

As shown in Table 1 and illustrated in the graph of FIG. 4, it was confirmed that the temperature of the fiber thermal insulators rapidly increased at the same time when the bulb was on, and after 5 minutes, the temperature of the surface increased by 15° C. or more in the Example and Comparative Examples 1 and 2.

However, the increase in the internal temperature of the fiber thermal insulators was smaller than the surface temperature thereof. While the differences between the surface temperature and the internal temperature were small in Example 1 and Comparative Example 1, respectively, when 20 minutes had elapsed, the difference between the surface temperature and the internal temperature in Comparative Example 2 was large.

Further, Example of the present invention had almost no difference between the surface temperature and the internal temperature after 20 minutes. However, Comparative Example 1 had a difference of about 2° C. When focusing on only the internal temperature, it was confirmed that the rate of temperature rise of the Example was higher than that of Comparative Example 1. Therefore, it can be seen that the fiber heat insulator including the ball-shaped light heat generating fiber aggregate has better heat generating efficiency than that of the fiber insulator including the web-typed fiber aggregate.

⊚ Density Measurement of Fiber Aggregate

The densities of Examples 1 to 3 and a general ball fire sold by T company (Comparative Example 3) were measured.

The density was measured by the method in which a 1-liter container was completely filled with a ball-shaped fiber aggregate by free falling the ball-shaped fiber aggregate from a height of 20 cm. Then, the weight thereof was measured to calculate the density. The results are shown in Table 2.

TABLE 2

| Number | Example 1 (g/l) | Example 2 (g/l) | Example 3 (g/l) | Comparative Example 3 (g/l) |
|---|---|---|---|---|
| 1 | 4.6 | 5.2 | 5.8 | 8.9 |
| 2 | 4.5 | 5.7 | 5.4 | 8.9 |
| 3 | 4.6 | 5.5 | 5.7 | 8.2 |
| 4 | 4.8 | 5.1 | 5.3 | 8.3 |
| 5 | 4.5 | 5.5 | 5.5 | 8.3 |
| 6 | 4.9 | 5.3 | 5.4 | 8.9 |
| 7 | 4.2 | 5.3 | 5.3 | 8.8 |
| 8 | 4.6 | 5.6 | 5.8 | 8.7 |
| 9 | 4.8 | 5.4 | 5.6 | 9.2 |
| 10 | 4.5 | 5.1 | 5.9 | 9.0 |
| Average | 4.6 | 5.37 | 5.57 | 8.72 |

As shown in Table 2, when the average diameter of the ball-shaped fiber aggregate was 4 mm, 5 mm and 6 mm, respectively, it had a density of 4.6 g/l, 5.37 g/l, and 5.57 g/l. The density of fiber aggregate of Comparative Example was 8.72 WI, which was remarkably higher than those of Examples 1-3. It indicates that the ball-shaped light heat generating fiber aggregate of embodiments of the present invention had a low density.

⊚ Measurement of Average Diameter and Standard Deviation

The average diameters, standard deviations, and kurtosis of Examples 1 to 3 and general ball fire sold by T Company (Comparative Example 3) were measured. The results are shown in Table 3 and illustrated in FIGS. 5-8. Graphs illustrating the distribution chart of Examples 1 to 3 and Comparative Example 3, respectively, are illustrated in FIGS. 5-8.

1. Method of Measurement and Calculation a. After collecting 1 g from each of the ball-shaped fiber aggregates of Examples 1 to 3 and the Comparative Example, the ball-shaped fiber aggregates were separated one by one, and the size was measured and classified in the range of 1 mm.

b. The average diameters, standard deviations, and kurtosis were calculated using the Excel program.

The average diameters, standard deviations, and kurtosis were calculated based on the highest value in the range of diameters. For example, when the diameter of the ball-shaped fiber aggregate is within 1 mm to 2 mm, the ball-shaped fiber aggregate is calculated to have a diameter of 2 mm.

TABLE 3

| Diameter (mm) | Example 1 | Example 2 | Example 3 | Comparative Example 3 |
|---|---|---|---|---|
| 1~2 | 41 | 9 | 0 | 46 |
| 2.1~3 | 191 | 28 | 2 | 99 |
| 3.1~4 | 384 | 165 | 27 | 139 |
| 4.1~5 | 242 | 357 | 112 | 85 |
| 5.1~6 | 51 | 144 | 311 | 161 |
| 6.1~7 | 27 | 32 | 98 | 18 |
| 7.1~8 | 16 | 25 | 52 | 41 |
| 8.1~9 | 7 | 9 | 25 | 5 |
| 9.1~10 | 6 | 6 | 1 | 2 |
| 10.1~11 | 0 | 3 | 8 | 0 |
| 11.1~12 | 0 | 0 | 4 | 0 |
| 12.1~13 | 0 | 0 | 2 | 0 |
| Counts per 1 g | 965 | 778 | 652 | 597 |
| Diameter (mm) | 4.3 | 5.15 | 6.35 | 4.79 |
| Standard deviation | 1.29 | 1.26 | 1.42 | 1.67 |
| Kurtosis | 3.16 | 3.45 | 3.43 | −0.38 |

As shown in Table 3, the number of ball-shaped fiber aggregates per 1 g of Examples 1 to 3 is larger than that of Comparative Example 3, indicating that the density thereof is low.

In Comparative Example 3, the standard deviation was 1.67 and the kurtosis was −0.38, and thus the distributions were not concentrated, indicating that the diameter uniformity of the ball-shaped fiber aggregate was low. However, in Examples 1-3 of the present invention, the deviations thereof were about 1.2 to about 1.4 and the kurtosis thereof was 3.0 or more, and thus the distributions were concentrated, indicating that the diameter of the ball-shaped light heat generating fiber aggregate according to embodiments of the present invention was very uniform.

The invention claimed is:

1. A method of producing a ball-shaped light heat generating fiber aggregate, the method comprising:
    preparing any one filament or a mixture of two or more filaments selected from the group consisting of a polyamide-based filament, a polyester-based filament, and a polypropylene-based filament;
    first-opening the selected filament to separate fibers;
    first-mixing the filament by wind power;
    spraying a light heat generating material to the mixed filament using a spray nozzle to apply the light heat generating material to the filament;
    drying the same with hot air so that the light heat generating material adheres to the filament;
    second-opening the light heat generating material-attached filament to separate fibers;
    second-mixing the second-opened filament by wind power; and
    producing the ball-shaped fiber aggregate by agglomerating the second-mixed filament.

2. The method according to claim 1, wherein the first-opening and second-opening are carried out by a carding cleaner in which two to four rollers having a plurality of pins are crossed such that the pins engage with each other, and wherein the following Equation is applied:

$$2 \leq L/G \leq 6 \qquad \text{Equation}$$

L: Fiber length of filament
G: Spacing between pins.

3. The method according to claim 1, wherein the first-mixing and second-mixing are carried out under a wind pressure of 100 mmAq to 200 mmAq and a wind volume of 20 to 80 m³/min.

4. The method according to claim 1, wherein the spraying includes laminating the mixed filament to have a thickness of 3 cm to 10 cm and then spraying the light heat generating material at a nozzle pressure of 0.2 MPa to 1 MPa.

5. The method according to claim 1, wherein the drying is carried out in hot air of 80° C. to 180° C. for 30 minutes to 120 minutes.

6. The method according to claim 1, wherein the producing the ball-shaped fiber aggregate includes moving the filament by wind power and moving the pin having a bent tip in a direction perpendicular to the wind to generate the ball-shaped fiber aggregate.

* * * * *